(12) United States Patent
Pamart et al.

(10) Patent No.: US 8,090,268 B2
(45) Date of Patent: Jan. 3, 2012

(54) LONG-DISTANCE SYNCHRONOUS TRANSMISSION METHOD USING OPTICAL FIBER

(75) Inventors: Jean-Luc Pamart, Pleumeur-Bodou (FR); Francois-Xavier Ollivier, Lannion (FR); Jerome Robillart, Trebeurden (FR)

(73) Assignee: Ekinops (FR)

( * ) Notice: Subject to any disclaimer, the term of this patent is extended or adjusted under 35 U.S.C. 154(b) by 491 days.

(21) Appl. No.: 10/536,954

(22) PCT Filed: Oct. 15, 2003

(86) PCT No.: PCT/FR03/50094
§ 371 (c)(1),
(2), (4) Date: Aug. 4, 2005

(87) PCT Pub. No.: WO2004/054151
PCT Pub. Date: Jun. 24, 2004

(65) Prior Publication Data
US 2006/0056849 A1    Mar. 16, 2006

Related U.S. Application Data

(60) Provisional application No. 60/430,066, filed on Dec. 2, 2002, provisional application No. 60/430,068, filed on Dec. 2, 2002.

(51) Int. Cl.
*H04B 10/00* (2006.01)

(52) U.S. Cl. ............................ 398/154; 398/75; 398/155

(58) Field of Classification Search .......... 398/154–155, 398/79, 75; 370/518, 395.62
See application file for complete search history.

(56) References Cited

U.S. PATENT DOCUMENTS

| 4,267,590 | A  | * | 5/1981  | Bosotti ........................... 398/91 |
| 5,812,297 | A  | * | 9/1998  | Mussino et al. .............. 398/198 |
| 5,953,138 | A  | * | 9/1999  | Ellis ............................... 398/75 |
| 6,512,616 | B1 | * | 1/2003  | Nishihara ...................... 398/54 |
| 6,714,548 | B2 | * | 3/2004  | Lauret ..................... 370/395.62 |
| 6,771,907 | B1 | * | 8/2004  | Yamazaki et al. .............. 398/59 |
| 2001/0038475 | A1 | * | 11/2001 | Wolf .............................. 359/124 |
| 2002/0018259 | A1 | * | 2/2002  | Hait ............................... 359/123 |
| 2002/0067527 | A1 | * | 6/2002  | Akiyama ....................... 359/135 |

FOREIGN PATENT DOCUMENTS

| EP | 1 128 582 A  | 8/2001 |
| EP | 1 233 567 A1 | 8/2002 |
| EP | 1 315 320 A  | 5/2003 |
| WO | WO 01/28138 A | 4/2001 |

OTHER PUBLICATIONS

T. Sangsiri et al., "Bit Synchronization Using Subcarriers for Control Signaling", IEEE Photonics Technology Letters, IEEE Inc., New York, US, vol. 11, No. 5, May 1999, pp. 602-604 (XP000830426).

* cited by examiner

*Primary Examiner* — Dzung Tran
(74) *Attorney, Agent, or Firm* — DLA Piper LLP (US)

(57) ABSTRACT

A process for transmitting data on an optical fiber including multiplexing in wavelength signals coming from a plurality of monochrome transmitters, each of which has its own wavelength, and modulating information to be transmitted by a carrier realized per channel, wherein timing (clocking) of each transmitter is controlled by a common clock.

21 Claims, 5 Drawing Sheets

LONG-DISTANCE SYNCHRONOUS TRANSMISSION METHOD USING OPTICAL FIBER

RELATED APPLICATION

This is a §371 of International Application No. PCT/FR2003/050094, with an international filing date of Oct. 15, 2003 (WO 2004/054151, published Jun. 24, 2004), which is based on U.S. patent application Nos. 60/430,066, filed Dec. 2, 2002, and 60/430,068, filed Dec. 2, 2002.

FIELD OF THE INVENTION

This invention relates to transmissions of signals on a line between a transmitter and a receiver. The invention relates more particularly to long-distance transmission of a signal on a connection comprising a succession of several segments of optical fiber of approximately 100 kilometers.

BACKGROUND

Transmission of signals by optical fibers over long distances meets problems of attenuation and chromatic dispersion. Thus, a signal that is very monochromatic at the beginning of the line will be dispersed and will no longer have sufficient level at the end of the line to be correctly reconstituted. The result is therefore a loss of information.

Early techniques used to resolve this problem were to install signal regeneration stations. The signal is first converted to an electronic signal, regenerated and retransmitted. This regeneration system was very expensive for a single transmission channel and thus for a single transmission wavelength.

Another known solution is optical amplification. The chromatic dispersion of the wavelength is compensated for by a fiber of opposing dispersion and attenuation is compensated for by an optical amplifier. That solution requires high-performance transmitters and receivers and remains expensive in single channel.

Moreover, to augment the number of signals to be transmitted on the line, multi-channel solutions rapidly became necessary. A plurality of transmitters uses different wavelengths. The data is then modulated to quasi-monochromatic signals and the quantity of information transmitted is thus augmented. The signals are then multiplexed before transmission on the optical line. Amplification and optical compensation are then realized simultaneously on the multiplex. That method has the disadvantage of using very expensive transmitters for each channel.

In the area of multiplexing in wavelength or WDM for Wavelength Division Multiplexing, there already exists a device and a process for regenerating data in an optical transmission in EP 1 233 567. The entering data stream is first demultiplexed by a demultiplexer in wavelength. Delays are then introduced in a specific manner for each channel, that is to say, the delayed signals are multiplexed again for each wavelength. The device comprises a modulator modulated by a high-frequency clock and a photodetector for an automatic optical adaptation of the delay lines.

That process is a method of signal regeneration successively using a demultiplexing, then a multiplexing of the signals. The delays introduced are of the optical type by virtue of the photodetector. It does not supply a solution for the shared transmission of different signals coming from a plurality of transmitters.

SUMMARY OF THE INVENTION

This invention relates to a process for transmitting data on an optical fiber including multiplexing in wavelength signals coming from a plurality of monochrome transmitters, each of which has its own wavelength, and modulating information to be transmitted by a carrier realized per channel, wherein timing (clocking) of each transmitter is controlled by a common clock.

This invention also relates to apparatus for transmitting data on an optical fiber including a plurality of monochrome transmitters, each of which has its own transmission wavelength, with each transmitter having a slave clock, a multiplexer, and a master clock controlling the slave clocks.

This invention further relates to a counter-reaction circuit for apparatus that transmits data on an optical fiber and which generates a frequency marker for injecting a disturbing spectral signal of a transmitter including a detector for an output signal of a gate that act on an automatic controller of a transmitter phase that obtains a selected spectral transformation of each marker.

BRIEF DESCRIPTION OF THE DRAWINGS

The invention will be better understood with the aid of the following description, given solely by way of explanation, of an embodiment of the invention with reference made to the attached drawings.

DETAILED DESCRIPTION

Figure 1:
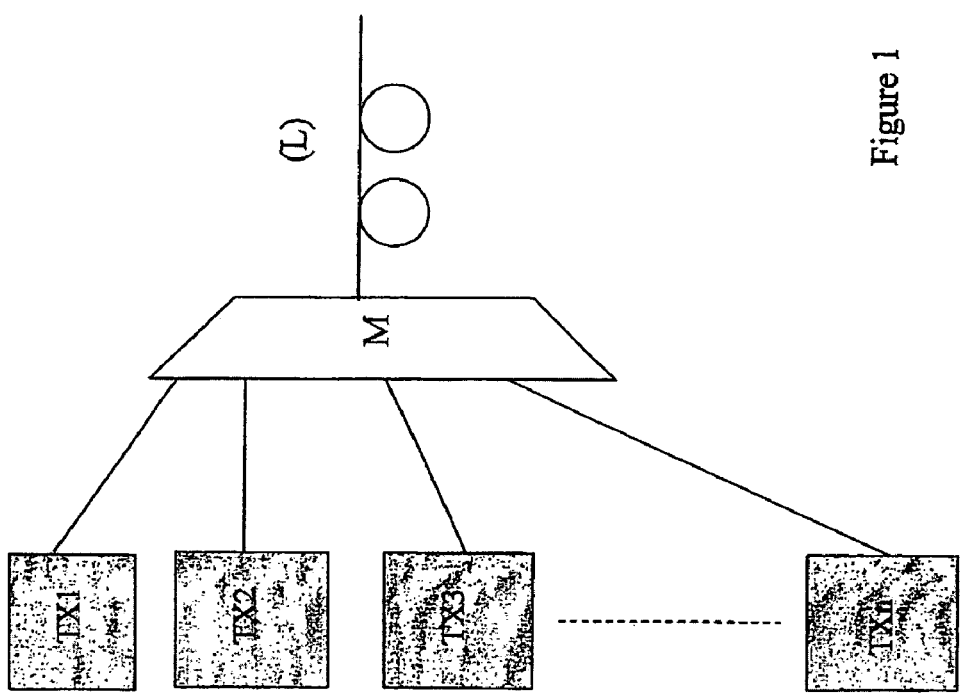
FIG. 1 shows a transmission scheme on an optical line through a wavelength comb in accordance with the prior art.

This invention provides a process of sharing performance for a long-distance optical transmission. This invention is remarkable in its broadest meaning in that it supplies a process for the transmission of data on an optical fiber comprising a stage of multiplexing in wavelength of signals coming from a plurality of monochrome transmitters, each of which has its own wavelength, and a stage of modulation of the information to be transmitted by a carrier realized per channel, characterized in that the timing (clocking) of each of these transmitters is controlled by a common clock.

In addition, the process preferably comprises a stage of placing all the carriers in a common and simultaneous form. The formatting (forming, shaping) stage advantageously comprises optimizing the form (shape) of the signal as a function of the characteristics of the propagation of the associated transport means.

The formatting stage advantageously comprises optimizing the optical parameters of the signal as a function of the characteristics of the propagation of the associated transport means.

The formatting stage advantageously comprises an operation of stabilizing the temporal parameters of the data stream.

In addition, the process preferably comprises a stage of synchronizing streams (pulses) emitted by the monochrome transmitters.

The formatting stage advantageously comprises an operation of aligning the phase of the signals generated by the transmitters.

The alignment operation may be subject to ambient parameters to compensate temporal signal variations. The alignment operation may also be subject to ambient parameters to compensate the differences and variations between the optical paths.

Each element of the multiplex is advantageously signed before the multiplexing stage by a frequency marker applied on the phase. Each element of the multiplex is advantageously signed before the multiplexing stage by a frequency marker applied on the amplitude.

According to one aspect, the marker is constituted of a signal having a predetermined spectrum. According to another aspect, the marker is constituted of a signal having a spectrum whose characteristics are functions of the disturbances experienced by the signal on the corresponding path.

The characteristics of the marker are preferably determined to disturb the marked signal in such a manner that the marking is evanescent during the passage in the gate.

The invention also relates to equipment for transmitting data on an optical fiber, comprising a plurality of monochrome transmitters, each of which has its own transmission wavelength and a multiplexer, characterized in that it comprises a master clock controlling the slave clocks of each of these transmitters. Moreover, the equipment advantageously comprises an optical gate that receives the multiplex of optical carriers as well as a cutting signal produced by this master clock.

It also preferably comprises frequency marking circuits for each element of the multiplex. According to one aspect, each of the frequency marking circuits applies the marking signal onto one of the transmitters. According to another aspect, each of the frequency marking circuits applies the marking signal onto the synchronization means of each path.

The optical gate advantageously comprises means for detecting each marker to control the characteristics of the formatting and adjustment of the phase of the corresponding path. The optical gate advantageously comprises means for spectral analysis of the marker to adjust the phase of the corresponding path.

The invention also relates to equipment for regenerating data on an optical fiber of the opto-electronic conversion means, a demultiplexer and a clock connected to at least one of these converters.

The invention also relates to a counter-reaction circuit for equipment for transmitting data on an optical fiber, characterized in that it generates a frequency marker for injecting a disturbing spectral signal of a transmitter, and comprises means for detecting the output signal of a gate for acting on means for the automatic control (slaving) of the transmitter phase to obtain the desired spectral transformation of each marker.

Turning now to the drawings, FIG. 1 is directed to the prior art. FIG. 1 illustrates n transponders TX transmitting according to different wavelengths. The signals are multiplexed by multiplexer M and then transmitted on long-distance optical line L. The n transponders should be high-performance transponders to permit the transmission.

Figure 2:
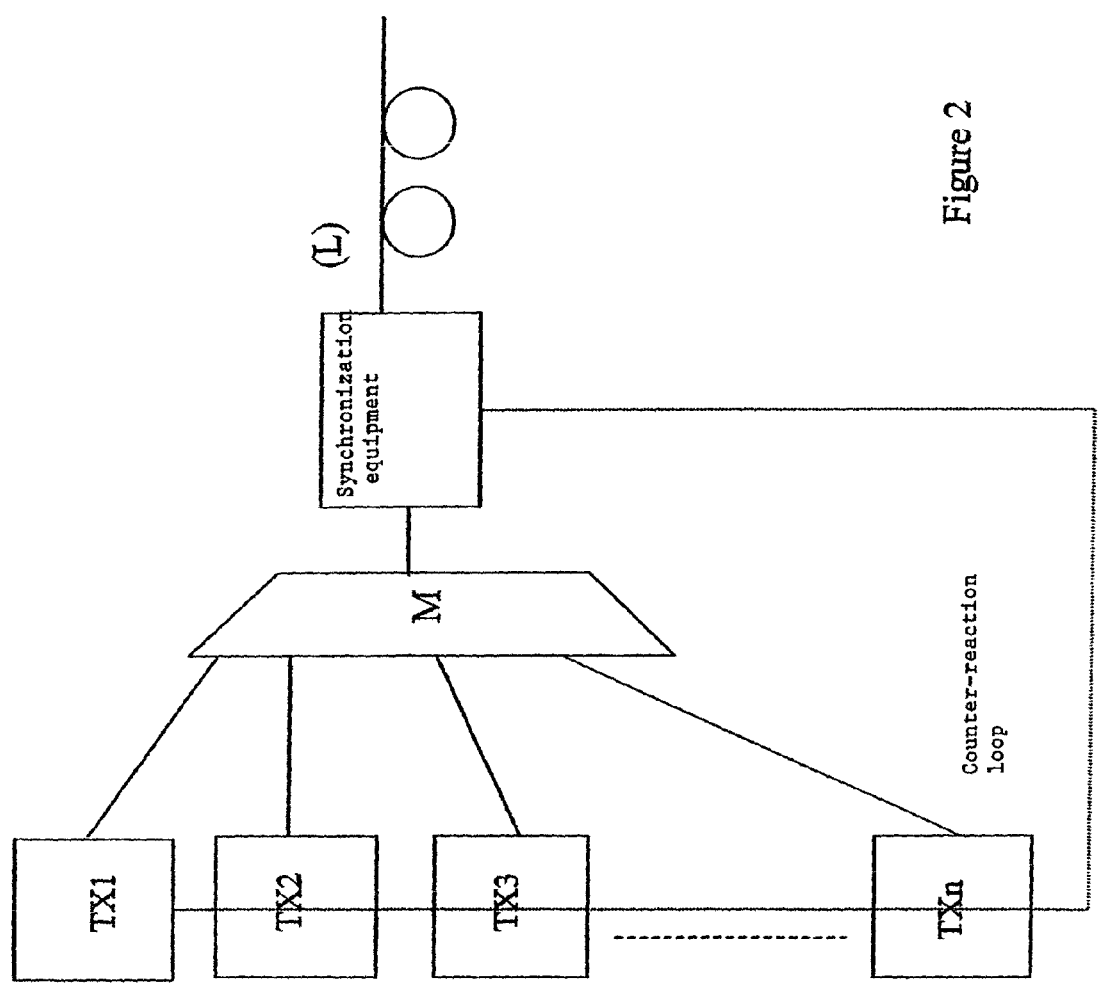
FIG. 2 shows a transmission scheme on an optical line through a wavelength comb in accordance with the invention.

According to aspects of the invention illustrated in FIG. 2, the synchronization equipment associated with the counter-reaction loop permits the obtention of a sharing of the performances of the transponders. The quality of the signal is thus obtained after passage through the synchronization equipment, which permits the use of transponders of a lesser quality that are therefore inexpensive.

Figure 3:
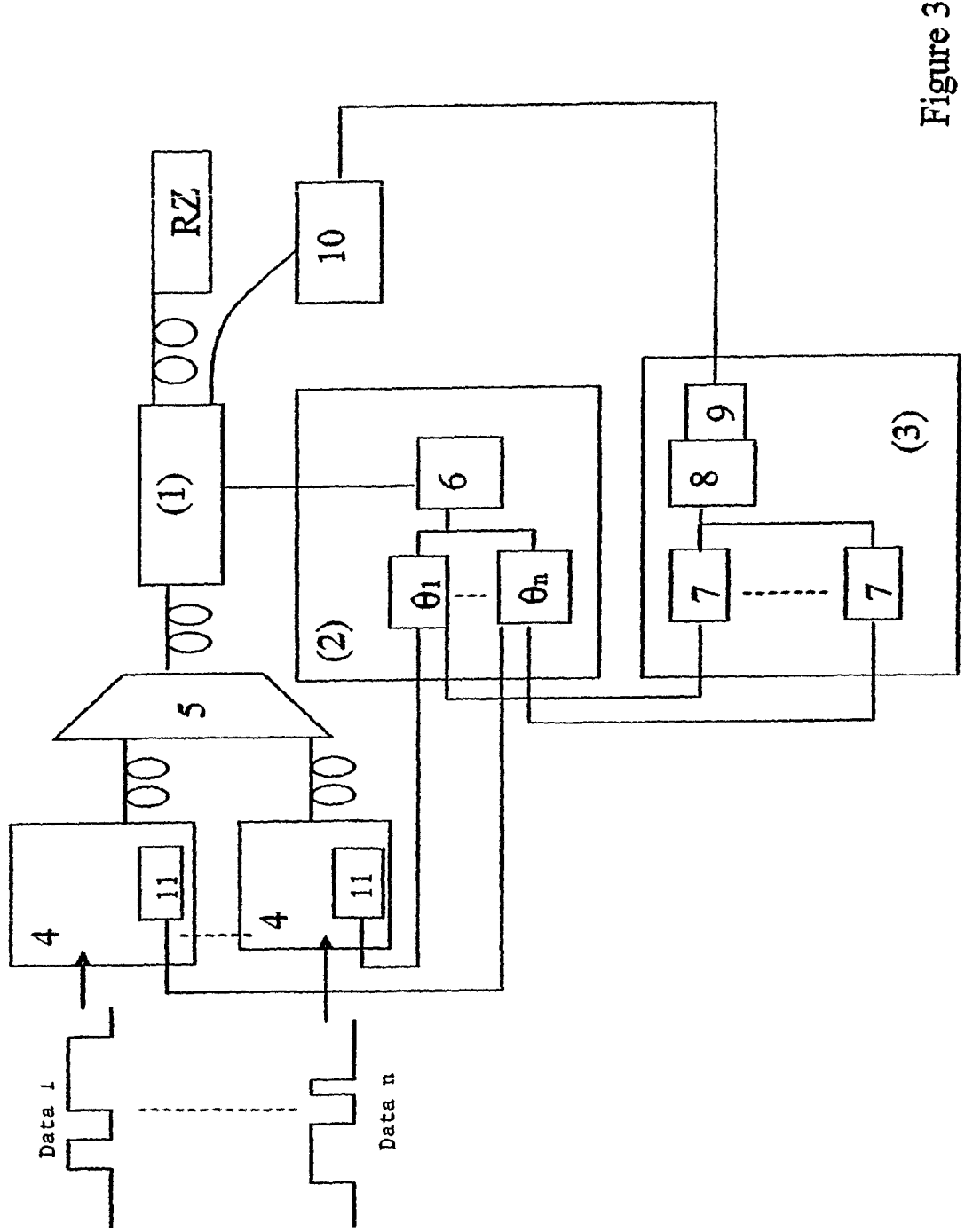
FIG. 3 shows a synoptic scheme of equipment for the transmission of data on an optical fiber in accordance with the invention.

FIG. 3 illustrates equipment according to aspects of the invention comprising the following functional subunits:

Part of a transmission comprising a plurality of transponders 4 permitting a synchronization of the streams entering on the local timing (rate) coming from synchronization block 2.

Multiplexer 5 receiving signals on the input coming from each of the transponders and supplying a multiplexed signal.

Optical gate 1 that ensures formatting of the multiplexed signal.

Synchronization circuit 2 that controls a clock of the optical gate as well as local clocks 11 of each of the transponders.

Signal processing circuit 3 that supplies disturbance signals acting on the phase of the transponder clocks.

The transmission part implements N monochrome transponders. Each transponder supplies a colored optical signal with a specific wavelength. The carrier of each transponder is modulated by the information to be transmitted in a known manner. Each transponder comprises a local clock 11. This local clock is a slave clock controlled by master clock 6 of synchronization circuit 2. The equipment can also comprise means for generating a data stream to be transmitted. Such a means obtains data and an associated frequency supplied by a clock with a period equal, in accordance with the application, to that of a binary data element.

A stage for synchronizing the data streams entering at a rate synchronous with the common clock is possibly necessary. This justification process is a known type.

The transponder of the invention also comprises, in a known manner, means for modulating an optical source by a signal coming from a data generator. The signal is also amplified to be electrically adapted to the components. The amplifiers can be low-cost within the framework of the invention.

Finally, the luminous source whose amplitude is to be modulated can possibly necessitate the use of a device for controlling the wavelength in the case of a WDM system.

The pre-accentuation of the level of each of the optical tributaries of the gate can be realized by means of an optical amplification device that is fixed or can be regulated, e.g., with SOA (Semiconductor Optical Amplifier) technology, EDFA (Erbium Doped Fiber Amplifier) or by fiber. The amplification at the optical gate output permitting the adaptation of the optical level at the line input can be realized by the same means as previously cited.

The electro-optical by deleting device can be either a direct modulation of the laser source or a modulation of the light source by means of an electro-optical modulator of the LiNO3 type or by electro-absorption. The two modulator types have the advantage of being inexpensive.

Synchronization block 2 can either be autonomous with its own oscillator or connected to an external reference. The clock resulting from the choice of one of these two sources serves as a low-frequency pilot for the high-frequency PLL that procures the cutting signal on optical gate 1. The phase locked loop (PLL) of synchronization block 2 also supplies the synchronization signal for each of transmitters 4. It also makes the phase adjustment for each of the paths to compensate for aging of the optical fiber, the demultiplexer and the transmitter.

Signal processing block 3 has the function of creating disturbances marked for each transmission channel. It also permits a spectral analysis of the markers after transformation through optical gate 1. This analysis is performed by rapid Fourier transform and digital filtering. It also performs the automatic control (slaving) of the transmitters by the PID (Proportional, Interval, Derivative) according to a method that adjusts the points measured to a set of set points.

The disturbers are applied on the delay elements of the synchronization block ($\theta_1, \theta_2, \ldots, \theta_n$). These disturbers are specific modifications of the phase or the amplitude of the signals as a function of the transmission channel. Since these disturbers are applied at the level of the delay lines and not at the level of the transponders, the operation is carried out with a low output (rate), thus reducing the cost of implementation. According to a preferred aspect, these are signals with a determined spectrum, one for each channel to be marked. This spectrum can also be a function of the characteristics of the disturbances undergone by the signal on each path. Moreover, after passing through the optical gate, this marking by disturbers must not modify the information. The latter is therefore filtered at the level of the optical gate.

The information transmitted from the digital signal processor, DSP, or signal processing unit 8 to the delay lines ($\theta_1, \theta_2, \ldots, \theta_n$) comprises the phase control resulting from the PID and the various disturbers stemming from n distinct digital/analog converters 7. The data is received by the DSP after opto-electronic conversion by converter 10 and digitization by analog/digital converter 9.

Furthermore, signal processing block 3 permits an analysis of the marked signals to adjust the phases of each path. This analysis is a spectral analysis of the specific markers and a detection of these markers in the main signal.

Optical gate 1 comprises an electro-optical modulator, e.g., of the Mach-Zehnder type. The optical stream from the transponder modulated by the data to be transmitted is of the NRZ (non-return to zero) type. The NRZ coding is a type or binary coding in which, e.g., the 0 is represented by a voltage of 0 volts and the 1 by V volts. The NRZ format is very sensitive to optical noises and non-linearities, in contrast to the RZ symmetric coding (return to zero), in which the 0 is coded by 0 V and the 1 by a transition from V volts to 0 volts. The RZ coding is particularly adapted to long-distance transmissions. This type of coding is also less expensive as concerns the equipment. Optical gate 1 performs the conversion of the NRZ coding into RZ permitting a robust transmission. The use of a modulator permitting a phase inversion of the optical signal, as is the case for the Mach-Zehnder, also authorizes implementation of the CS-RZ (carrier suppression RZ) format. This format, obtained by applying one half the frequency applied in the case of the RZ modulation on the optical gate, has the advantage of the spectral width of the NRZ format and the advantage of the robustness to noise of the RZ format.

Figure 5:
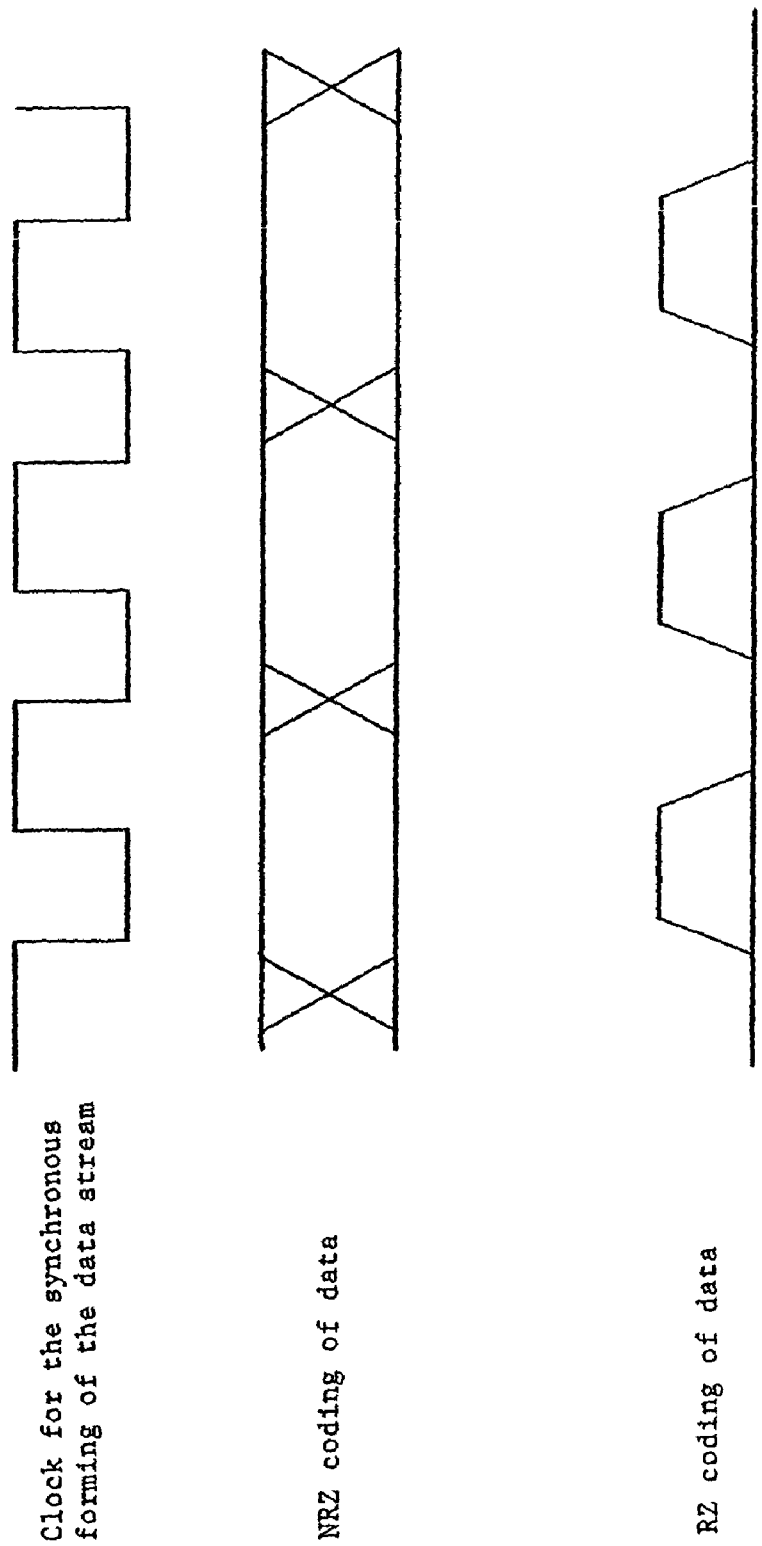
FIG. 5 shows the formation of a signal of the RZ type starting from the associated NRZ signal.

FIG. 5 shows different representations of the data for the transmission. In this case, the RZ signal is obtained by cutting the NRZ sequence of at least one clock with a period identical to that of the binary element of the stream to be modulated with the aid of the external modulator.

Moreover, optical gate 1 performs an optimization of the optical parameters of the signal received, in particular, in the form of a reduction of the signal chirp.

Finally, optical gate 1 performs an operation of stabilizing the time division (timing) parameters of the data stream, in particular, in the form of a reduction of the jitter of the modulating signal.

These two operations of the stabilization of the time division parameters and optimization of the optical parameters significantly improve the quality of the transmission after passage through the optical gate.

Figure 4:
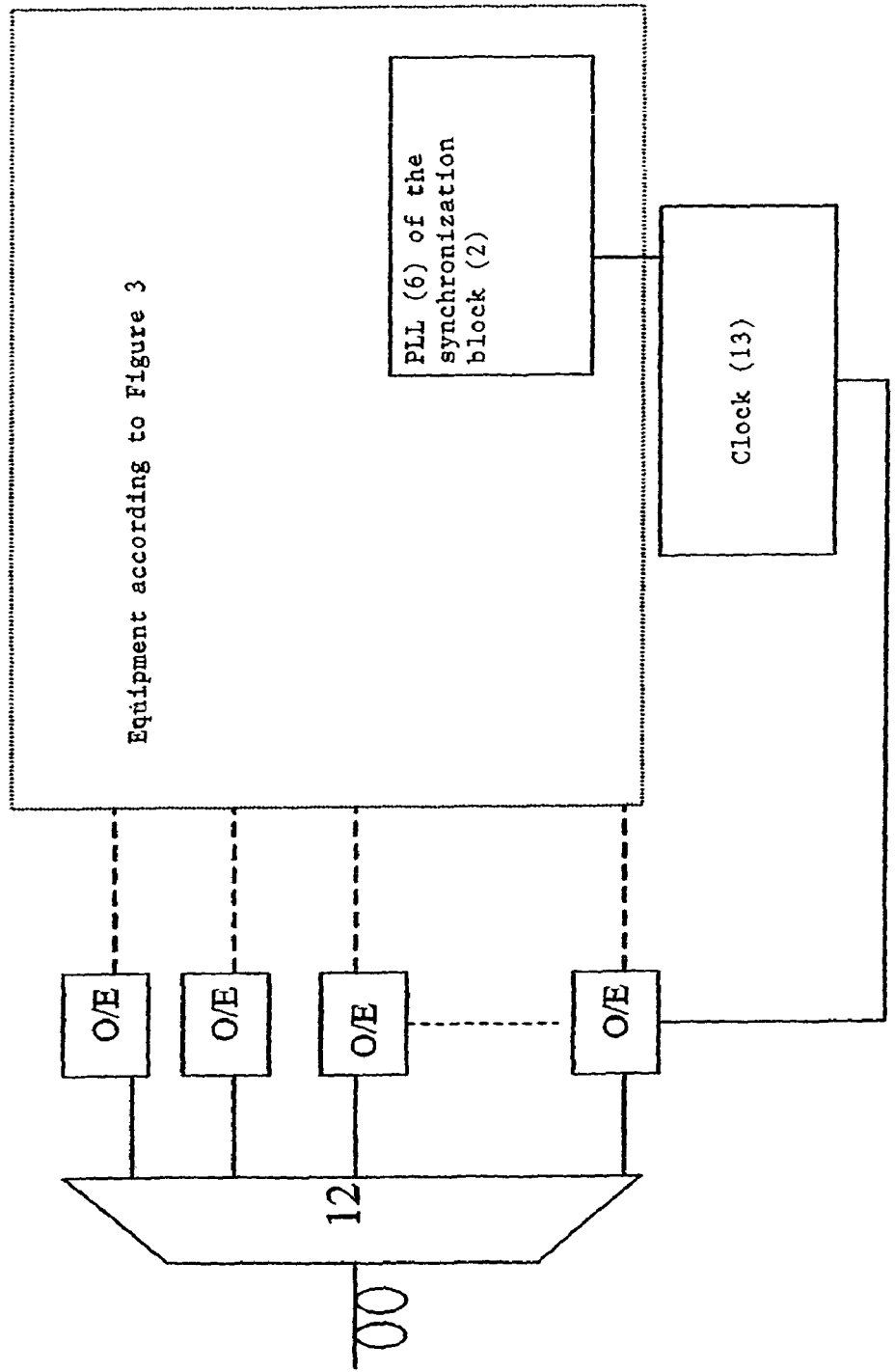
FIG. 4 shows the case of a regeneration site in accordance with the invention.

Note that the invention can also be used for signal regeneration on an optical line. This is done by adding the elements described below as in FIG. 4.

The highest degree of regeneration, called "3R" regeneration, involves a re-formatting (re-shaping) of impulses in the area of the amplitude (2R regeneration for re-amplification and re-shaping) and re-timing area. At the level of the regeneration site a demultiplexer permits separation of the signals to be regenerated (after a loss of level or a chromatic dispersion). The signals pass through opto-electric (O/E) converters. The realignments of the signals are then carried out by the equipment of the invention described above and the master clock PLL is fed by a new reference clock 13 defined by the analysis of one of the signals.

According to one aspect, several signals are analyzed and the clock will be defined by the best signal obtained. The opto-electric converters are then connected to n transponders and to the equipment described in FIG. 3, comprising optical gate 1, synchronization block 2 and signal processing block 3.

It is appropriate to note that delays introduced by this regeneration mode are of the electric type following the optical-electronic conversion.

The invention is described above by way of example. It is understood that one skilled in the art is capable of realizing different variants of the invention without departing from the scope of the appended claims.

The invention claimed is:

1. A process for transmitting data on an optical fiber comprising:
   wavelength division multiplexing of signals coming from a plurality of monochrome transmitters, each of which has its own wavelength and a slave local clock,
   modulating information to be transmitted by a carrier realized per channel, and
   reformatting a non-return to zero (NRZ) formatted, multiplexed signal to a return to zero (RZ) multiplexed signal or to carrier suppression return to zero (CS-RZ) multiplexed signal with an optical gate comprising an electro-optical modulator and a clock,
   wherein said reformatting is common and simultaneous for all carriers in the multiplexed signal, and
   wherein each slave local clock from each transmitter is controlled by a synchronization circuit comprising a master clock and a phase locked loop (PLL), said master clock controlling the clock of said optical gate and each slave local clock by using said phase locked loop which supplies the synchronization signal for each of the transmitters.

2. The process according to claim 1, wherein the reformatting comprises optimizing the form of the signal as a function of characteristics of propagation of an associated transport means.

3. The process according to claim 1, wherein the reformatting comprises optimizing optical parameters of the signal as a function of the characteristics of propagation of an associated transport means.

4. The process according to claim 1, wherein the reformatting comprises an operation of stabilizing temporal parameters of data.

5. The process according to claim 1, comprising synchronizing streams (pulses) emitted by the transmitters.

6. The process according to claim 1, wherein the reformatting comprises aligning the phase of signals generated by the transmitters.

7. The process according to claim 6, wherein the aligning is subject to ambient parameters to compensate for temporal signal variations.

8. The process according to claim 6, wherein the aligning is subject to ambient parameters to compensate for differences and variations between optical paths.

9. The process according to claim 1, wherein each element of the multiplexer is signed before multiplexing by a frequency marker applied on the phase.

10. The process according to claim 1, wherein each element of the multiplexer is signed before multiplexing by a frequency marker applied on the amplitude.

11. The process according to claim 10, wherein the marker comprises a signal with a predetermined spectrum.

12. The process according to claim 10, wherein the marker comprises a signal with a spectrum whose characteristics are a function of disturbances undergone by the signal on a corresponding path.

13. The process according to claim 10, wherein characteristics of the marker are determined to disturb a marked signal in such a manner that marking is evanescent during passage through the gate.

14. An apparatus for transmitting data on an optical fiber comprising a plurality of monochrome transmitters, each of which has its own transmission wavelength, with each transmitter having a local slave clock;
a multiplexer for wavelength division multiplexing signals coming from said plurality of monochrome transmitters;
an optical gate that comprises an electro-optical modulator and a clock and that receives multiplexed non-return to zero (NRZ) formatted signals and that reformats said multiplexed non-return to zero (NRZ) formatted signals to multiplexed return to zero (RZ) signals or to multiplexed carrier suppression return to zero (CS-RZ) signals, said reformatting being common and simultaneous for all carriers in the multiplexed signal; and
a synchronization circuit comprising a master clock controlling the clock of said optical gate and each slave local clock with a phase locked loop which supplies the synchronization signal for each of the transmitters.

15. The apparatus according to claim 14, further comprising frequency marking circuits for each element of the multiplex.

16. The apparatus according to claim 15, wherein each of the frequency marking circuits applies the marking signal onto one of the transmitters.

17. The apparatus according to claim 15, wherein each of the frequency marking circuits applies the marking signal onto synchronizer of each path.

18. The apparatus according to claim 14, wherein the optical gate comprises a detector for each marker to control characteristic of the formatting and adjustment of the phase of a corresponding path.

19. The apparatus according to claim 14, wherein the optical gate comprises a spectral analyzer for the marker to adjust the phase of each path.

20. The apparatus according to claim 14, further comprising an optical converter, a demultiplexer and a clock connected to at least one of the converters.

21. A counter-reaction circuit for an apparatus that transmits data on an optical fiber comprising a plurality of monochrome transmitters, each of which has its own transmission wavelength, with each transmitter having a local slave clock; an optical gate that comprises an electro-optical modulator and a clock and that receives multiplexed non-return to zero (NRZ) formatted signals and that reformats said multiplexed non-return to zero (NRZ) formatted signals to multiplexed return to zero (RZ) signals or to multiplexed carrier suppression return to zero (CS-RZ) signals; and an automatic controller of each transmitter phase comprising a master clock and a phase locked loop (PLL), said master clock controlling the clock of said optical gate and each slave local clock by using said phase locked loop which supplies the synchronization signal for each of the transmitters, wherein said counter-reaction circuit generates a frequency marker for injecting a disturbing spectral signal of each transmitter and further comprises a detector of an output signal from the optical gate which acts on the automatic controller of each transmitter phase to produce a selected spectral transformation of each marker.

* * * * *